3,218,284
POLYVINYL ALCOHOL PLASTICIZED BY SALTS
OF MONOCARBOXYLIC ACIDS
Donald M. Gardner, Springfield, Mass., assignor, by mesne assignments, to Monsanto Company, a corporation of Delaware
No Drawing. Filed Aug. 28, 1962, Ser. No. 220,039
4 Claims. (Cl. 260—31.2)

The present invention relates to the plasticization of partially or completely hydrolyzed polyvinyl esters with certain salts of monocarboxylic acids and monovalent metals; more particularly, it relates to polyvinyl alcohol plasticized with sodium acetate and similar electrolytes.

The problem of plasticizing polyvinyl alcohol is well recognized in the art and has been attacked in several manners. Internal plasticization has been achieved by modifying the chemical structure of the polymer as, for example, by ethoxylation of the alcohol groups as shown in U.S. Patent 2,936,263. It has long been known also that acetylation helps to improve the poor elongation characteristics of polyvinyl alcohol. This type of approach however suffers from the obvious disadvantage of an added processing operation prior to the preparation of the final form of the polymer, e.g., film. This additional processing generally requires specialized equipment and increases the manpower expenditure, thus adding significantly to the cost of the plasticized composition to the user, thereby limiting the potential employment of the material.

The brittleness of polyvinyl alcohol film has been eliminated also to some extent by the use of external plasticizers. Known external plasticizers are: the polyols, including the lower glycols generally and glycerine especially; liquid polyesters as disclosed in U.S. Patent 2,611,-756; acid esters of polycarboxylic acids such as ethyl acid phthalate, U.S. Patent 2,963,461; and nonionic polyethylene oxide compounds, as disclosed in co-pending application No. 40,170, filed July 1, 1960, and now abandoned.

Vinyl alcohol polymers plasticized with the known polyols become objectionably soft in high relative humidity and are brittle and tender at low relative humidity. Another objection to the polyols or to any other type of humectant plasticizer is that they tend to migrate out of the film, leaving the film again very brittle or fragile, hence reducing its suitability for almost any long term application. Another objection to the use of polyols is the blocking or sticking together of film prepared from compositions plasticized with them at high relative humidity, a phenomenon which also occurs after exudation of the plasticizers.

As to the polyester plasticizers mentioned earlier, they are incompatible with fully hydrolyzed grades of polyvinyl alcohol but only with those grades containing more than 33% of the original polyvinyl acetate in combination. Similarly, the use of the nonionic polyethylene compounds is limited to water soluble polyvinyl alcohol containing more than 20% polyvinyl ester by weight.

An object of the invention therefore is to provide inexpensive, non-volatile, non-migrating, compatible plasticizers for completely or partially hydrolyzed polyvinyl esters.

This and other objects which will become evident in the course of the description of the invention are accomplished by compounding sodium acetate with polyvinyl alcohol. Films prepared from polyvinyl alcohol so plasticized have good clarity, complete freedom from tack and possess a desirable degree of slip. In spite of the fact that sodium acetate is an ionic, crystalline salt, it imparts good elongation quality to polyvinyl alcohol, thus making possible a degree of elongation much greater than that permitted by the bound acetate introduced in the molecule by the acetylation of the resin. In addition, such an external plasticizer as sodium acetate has less detrimental effect on the humidity resistance of polyvinyl alcohol than that operated by internal plasticization. The excellent performance of sodium acetate as plasticizer of polyvinyl alcohol is exceptionally surprising since pure sodium acetate is not a liquid as are most plasticizers but rather is a crystalline solid which does not melt below 324° C. Still another benefit of this compound lies in its buffering action which provides protection to the resin against the degradative influence of strong acids.

Preferred products of the invention are illustrated in the following examples. All parts and percentages in these examples are parts and percentages by weight unless otherwise specified. Solution viscosities are measured with a Brookfield viscosimeter at 20° C., using a No. 4 spindle.

Examples I–IV

The required amount of sodium acetate trihydrate was added to a 10% total solids solution of Gelvatol 1–90, a polyvinyl alcohol containing 0.42% polyvinyl acetate and having a viscosity, as a 4% aqueous solution, of 62.3 centipoises. Films were cast on aluminum foil and dried about one hour at 70° C. in a circulating air oven. After stripping, the films were aged one week at 50% relative humidity at 73° C. before making the tensile tests.

Each tensile measurement is the average of results for 5 specimens cut from the same piece of cast film; the average standard deviation within each set was about 400 p.s.i. on rupture strength and 50% on elongation. The specimens were 2 in. x 0.5 in. x about 0.002 in.; the thickness of each specimen was taken as the average of 5 micrometer readings, each estimated to the nearest 0.0001 inch. The Instrom Universal tester was operated at 10 lbs. full scale load, 5 i.p.m. crosshead speed and 5 i.p.m. chart speed. The 100% modulus is the force necessary to stretch the film to twice its original length.

The results of the tests on this particular polyvinyl alcohol plasticized with various amounts of sodium acetate are given in Table 1.

TABLE 1.—VISCOSITY AND TENSILE DATA FOR GELVATOL 1-90 PLASTICIZED

| Ex. | Sodium acetate trihydrate (parts/100 resin) | Viscosity of 10% solution (cps.) | Rupture strength (p.s.i.) | 100% modulus (p.s.i.) | Percent elongation |
|---|---|---|---|---|---|
| I | 0 | 3,400 | 11,500 | *12,500 | 22 |
| II | 10 | 3,900 | 8,200 | 6,800 | 140 |
| III | 20 | 4,500 | 7,000 | 5,400 | 180 |
| IV | 30 | 4,900 | 5,300 | 4,200 | 180 |

*Extrapolated.

The compatibility of sodium acetate with this polyvinyl alcohol was found to be excellent in solution. However, castings of solutions containing more than 20 parts of salt per 100 parts resin showed some white sodium acetate on their surfaces after drying.

Examples V–VIII

In these samples Gelvatol 30–30 was used rather than the Gelvatol 1–90 employed in the first set of examples. This Gelvatol 30–30 is a polyvinyl alcohol containing 29.9% polyvinyl acetate and having a viscosity of 4.65 centipoises as a 4% aqueous solution at 20° C. The mixing, casting and measurement of properties were carried out as usual with the exception that in the present examples the required amounts of sodium acetate shown in Table 2 were dissolved first and the solutions were then brought to a 20% total solids content with the polyvinyl alcohol. Relevant film properties are given in the following table.

TABLE 2.—TENSILE DATA FOR GELVATOL 30-30 PLASTICIZED

| Ex. | Sodium acetate trihydrate (parts/100 resin) | Rupture strength (p.s.i.) | 100% modulus (p.s.i.) | Percent elongation |
|---|---|---|---|---|
| V | 0 | 7,900 | *6,200 | 70 |
| VI | 5 | 5,400 | 5,000 | 180 |
| VII | 10 | 4,400 | 2,900 | 190 |
| VIII | 15 | 3,700 | 1,800 | 300 |

*Extrapolated.

At these levels, the compatibility of the salt with the polyvinyl acetate was excellent both in solution and in the film.

*Examples IX–X*

The Gelvatol 30-30 of Examples V–VIII was used again, but sodium glycolate and sodium propionate were substituted for sodium acetate. Table 3 shows the results on films containing 10 parts of salt per hundred parts of resin.

TABLE 3

| Ex. | Salt | Rupture strength (p.s.i.) | 100% modulus (p.s.i.) | Percent elongation |
|---|---|---|---|---|
| IX | Na glycolate | 4,800 | 4,100 | 170 |
| X | Na propionate | 3,200 | 1,800 | 200 |

Again, excellent compatibility was found to be the case.

The polymers which can benefit from this invention belong to the general class of partially to completely hydrolyzed vinyl ester homopolymers as well as partially to completely hydrolyzed copolymers made up of either different vinyl ester monomers or of a vinyl ester monomer with another compatible vinyl monomer which is not a vinyl ester. This will be illustrated presently. These polyvinyl alcohols or hydrolyzed polyvinyl esters should have at least 20% of their ester groups hydrolyzed off and possess a molecular weight average within the range of 1,200 to 500,000.

For example, useful polyvinyl alcohols are those obtained by the hydrolysis of 20 to 100% of the ester group of homopolymers such as those of vinyl acetate, vinyl propionate, vinyl butyrate, vinyl hexoate, vinyl benzoate and others. Typical useful vinyl alcohol terpolymers are those obtained by the partial hydrolysis of vinyl ester copolymers such as copolymers of a vinyl ester with another vinyl ester such as vinyl acetate, vinyl propionate, vinyl butyrate, vinyl hexoate, vinyl stearate, and the like; copolymers of a vinyl ester with a vinyl halide such as vinyl chloride and vinyl bromide; copolymers of a vinyl ester with the lower alkyl esters of acrylic acid such as methyl acrylate, ethyl acrylate, octyl acrylate and the like; copolymers of a vinyl ester with the lower alkyl esters of methacrylic acid including methyl, propyl, butyl, hexyl and octyl methacrylates; copolymers of a vinyl ester with other monomers such as ethylene, propylene, isobutylene and so on. All these useful vinyl alcohol polymers are well known and methods for their preparation are readily available.

This invention is particularly applicable to water soluble polyvinyl alcohols formed by the hydrolysis of the vinyl ester polymers and copolymers just enumerated. These preferred water soluble polyvinyl alcohols may contain from 0 to 45% unhydrolyzed ester groups and may have a viscosity ranging from 3 to 65 centipoises as 4% aqueous solutions at 20° C. It should be kept in mind in this respect that the water solubility of such polymers is affected by, in addition to the degree of hydrolysis and the molecular size as indicated by viscosity, the nature of the remaining ester groups. If said groups be benzoate or stearate, for instance, much less than 45% of them must remain in the polyvinyl alcohol molecule if the latter is to be water soluble. An especially preferred class of polyvinyl alcohols is afforded by the completely or partially hydrolyzed polymers of vinyl acetate, this by reason of the commercial availability of such materials. Methods for the preparation of such polymers are found in U.S. Patents 2,502,715 and 2,643,994.

The plasticizing salts with which this invention is concerned are the monovalent metal salts of monobasic organic acid containing from 2 to 5 carbon atoms. Cations may be selected from sodium, potassium, rubidium, lithium and cesium, sodium being favored for its commercial aspects. The acid carbon chain may be straight or branched and may contain substituents such as the hydroxyl group which contributes to a greater tensile strength in the plasticized polyvinyl alcohol while providing the desired elongation property.

The substitution of hydrogen atoms in the acid carbon chain by carboxyl groups, to give polycarboxylic acids, and the replacement of monovalent alkali metals by polyvalent metals have a seriously adverse effect on the compatibility of the resulting salts with the resins.

Specific examples of preferred plasticizing salts are sodium acetate, sodium propionate, sodium butyrate, sodium glycolate and sodium methacrylate.

Satisfactory elongation capacity has been obtained by using quantities of plasticizing salts varying from 3 to 40 parts per 100 parts of resin by weight (phr.) the preferred range being for general applications 5 to 30 parts of salt per 100 parts of resin. The ratio of components actually selected for a particular application, on the other hand, will depend on the nature of that application. In this respect, it should be noted that with salt contents of up to 35 phr., the plasticized material is non-tacky and has excellent elongation possibilities without too great a decrease in tensile strength. Also, as pointed out earlier, white sodium acetate powder appears at the surface of polyvinyl alcohol plasticized with more than 20 phr. sodium acetate, a phenomenon which does not detract from the usability of polyvinyl alcohol in general but which may be undesirable in film applications.

The plasticized polyvinyl alcohol of this invention can be characterized as a film by possessing a tensile strength within the range of 3,000–4,000 p.s.i. and an elongation at rupture of 75 to 340%. Other properties will also vary according to the extent of plasticization but it is possible, as described in the previous paragraph, to obtain clear, glossy, continuous and non-tacky film having a desirable degree of slip by using the proper proportions of components.

It is not intended to limit the present invention to a mixture of a vinyl alcohol polymer and a salt plasticizer. For example, other plasticizers such as the polyethoxylated phenol known as Pycal 94 may be used to good advantage in conjunction with the present crystalline plasticizers. The properties of the plasticized compositions may be further improved by the addition of antioxidants and slip agents. It is obvious that pigments, pigment extenders and other inert materials may also be added to these compositions without difficulty. It is understood therefore that the invention is not to be limited except by the scope of the following claims.

What is claimed is:

1. A composition of matter consisting essentially of 100 parts of a vinyl alcohol polymer which is the hydrolized product of a polymer taken from the group consisting of homopolymers of vinyl esters and copolymers of vinyl esters and other ethylenically unsaturated monomers copolymerizable therewith, said vinyl alcohol polymer containing from 0 to 45% unhydrolized vinyl ester groups, and, from 3 to 40 parts of a monovalent alkali metal salt of a monobasic acid containing 2 to 5 carbon atoms and taken from the group consisting of straight and branched chain acids and hydroxy substituted acids thereof, said metal being taken from the group consisting of sodium, potassium, rubidium, lithium and cesium.

2. A composition of matter consisting essentially of 100 parts polyvinyl alcohol containing from 0 to 45% unhydrolyzed acetate groups and 3 to 40 parts sodium glycolate.

3. A composition as in claim 2 wherein the salt content is from 5 to 20 parts.

4. A polyvinyl alcohol film consisting essentially of a water-soluble hydrolyzed polyvinyl acetate and 5 to 20 parts, per 100 parts by weight of the hydrolyzed polyvinyl acetate, by weight of sodium acetate.

References Cited by the Examiner
UNITED STATES PATENTS

| | | | |
|---|---|---|---|
| 2,854,436 | 9/1958 | Corbiere et al. | 260—45.85 |
| 2,999,076 | 9/1961 | Talcott | 260—45.85 |
| 3,002,943 | 10/1961 | Kebrich | 260—45.85 |

MORRIS LIEBMAN, *Primary Examiner.*